United States Patent
Hamada

(10) Patent No.: US 9,030,423 B2
(45) Date of Patent: May 12, 2015

(54) OPERATION INSTRUCTING DEVICE, IMAGE FORMING APPARATUS INCLUDING THE SAME AND OPERATION INSTRUCTING METHOD

(75) Inventor: Ryoh Hamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 625 days.

(21) Appl. No.: 13/398,044

(22) Filed: Feb. 16, 2012

(65) Prior Publication Data

US 2012/0223897 A1   Sep. 6, 2012

(30) Foreign Application Priority Data

Mar. 1, 2011   (JP) .................. 2011-043627

(51) Int. Cl.
  *G06F 3/041*   (2006.01)
  *H04N 1/00*    (2006.01)

(52) U.S. Cl.
  CPC ....... *H04N 1/00381* (2013.01); *H04N 1/00411* (2013.01); *H04N 1/0044* (2013.01); *H04N 1/00469* (2013.01)

(58) Field of Classification Search
  CPC .. G06F 3/0488; G06F 3/04892; G06F 3/0346
  USPC ....................... 345/173; 178/18.01
  See application file for complete search history.

(56) References Cited

U.S. PATENT DOCUMENTS

| 8,144,131 | B2 * | 3/2012 | Nishitani et al. | 345/174 |
| 8,487,903 | B2 * | 7/2013 | Anno et al. | 345/174 |
| 2009/0085866 | A1 * | 4/2009 | Sugahara | 345/156 |
| 2011/0115730 | A1 * | 5/2011 | Kim et al. | 345/173 |

FOREIGN PATENT DOCUMENTS

| JP | 5-002589 A | 1/1993 |
| JP | 2000-163031 A | 6/2000 |
| JP | 2007-019888 A | 1/2007 |
| JP | 2008-151513 A | 7/2008 |

\* cited by examiner

*Primary Examiner* — Abbas Abdulselam
(74) *Attorney, Agent, or Firm* — Renner, Otto, Boisselle & Sklar, LLP

(57) ABSTRACT

An operation instructing device includes a display unit that displays an image and a detecting unit that detects a touched position and thereby specifies a corresponding position of an image displayed on the display unit. While an image is displayed on the display unit, if the detecting unit detects that at least two points A and B are touched in a portion of the detecting unit corresponding to the image, assuming that the image is formed on a sheet of recording paper, a distance between two points of the image formed on the sheet of recording paper corresponding to the two touched points is calculated and displayed on a display panel. Thus, an error in operation instruction such as enlargement and reduction can be reduced, and hence, wasteful consumption of ink and recording paper can be reduced.

5 Claims, 8 Drawing Sheets

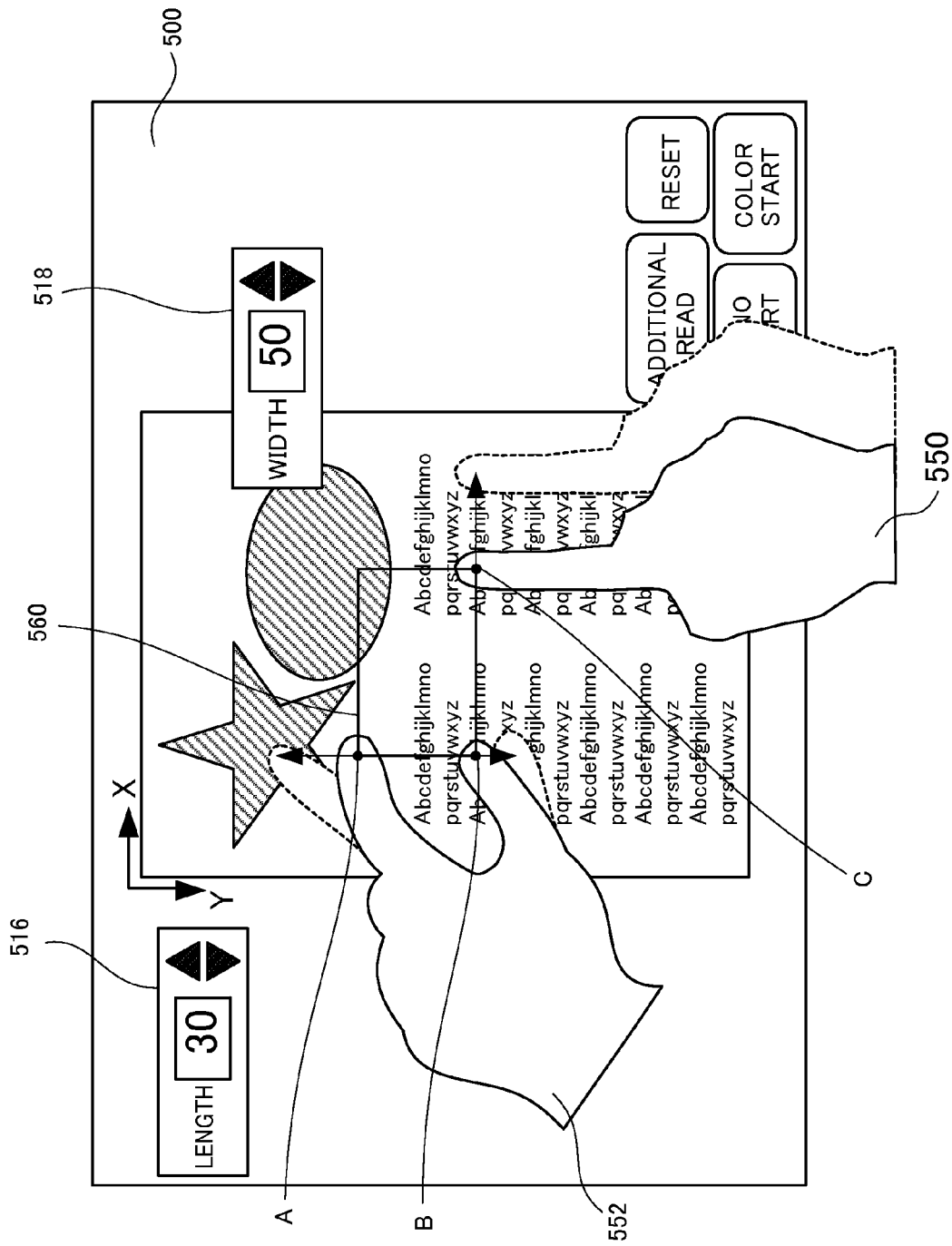

OPERATION INSTRUCTING DEVICE, IMAGE FORMING APPARATUS INCLUDING THE SAME AND OPERATION INSTRUCTING METHOD

CROSS-REFERENCE TO RELATED APPLICATION

This nonprovisional application claims priority under 35 U.S.C. §119(a) on Patent Application No. 2011-043627 filed in Japan on Mar. 1, 2011 the entire contents of which are hereby incorporated by reference.

BACKGROUND OF THE INVENTION

Field of the Invention

The present invention relates to a device for instructing an operation on a displayed image and, more specifically, to an operation instructing device capable of instructing enlargement/reduction of an image through a touch operation by a user, as well as to an image forming apparatus provided with the device and an operation instructing method.

Recently, as one type of image processing apparatuses as electronic equipment, an image forming apparatus (typically a copy machine) forming an image on a sheet of recording paper has come to be widely used. A multifunction peripheral (MFP) is one type of such image forming apparatuses. An MFP has a plurality of functions such as copying, printing, transmitting a facsimile (hereinafter facsimile will be also denoted as FAX) and scanning.

In an image forming apparatus, an operation panel formed by arranging a transparent touch-panel on a surface of a liquid crystal display panel is often used to facilitate operations and settings. On the liquid crystal display panel, status of the image forming apparatus is displayed on a timely basis, and by a touch-operation (touching the touch-panel with one's finger) in accordance with the displayed contents, an operation of the image forming apparatus can be set.

In a digital image forming apparatus provided with the touch-panel, various processes can be made easily on image data, before forming an image. By way of example, a read image may be displayed on the touch-panel, various processes on the image may be designated using the touch-panel, and an expected manner of output (printed image) may be displayed beforehand (preview function).

For instance, assume that printing in a size different from an original document is desired. A method has been known to directly designate copy magnification (zoom ratio) by numerical values (for example, 25% to 400%). Additionally, a method has been known in which when a user inputs an original image (document) and desired finished dimension through the operation panel, copy magnification is calculated and output image data is formed using the calculated value. Referring to FIG. 1, on a liquid crystal display panel 900, a window 910 allowing designation of copy magnification is displayed, and in this window, a window 920 allowing designation of copy magnification based on dimensions is displayed. Using ten keys 930 displayed on liquid crystal display panel 900 (that is, by pressing corresponding portions of the touch-panel), a dimension of 100 mm of a prescribed portion of the original and a finished dimension of 125 mm of the corresponding portion are input to two input areas on window 920. Thus, copy magnification is automatically calculated and magnification of 125% is displayed on the right side of window 920.

Further, as a method of directly operating a displayed image, Japanese Patent Laying-Open No. 2000-163031 (hereinafter referred to as '031 Reference) discloses portable information equipment allowing a user to operate an image displayed on a display unit with his/her finger. When the user touches a portion of a displayed image of which size is to be changed with two fingers and expands or narrows a space between the two fingers, enlargement or reduction can be instructed. At the same time, the displayed image is enlarged/reduced.

In the method of calculating the copy magnification by designating the dimension of original image (document) and the finished dimension, it is unnecessary for the user to calculate the copy magnification. It is necessary, however, for the user to measure a length on the document, which is troublesome. A ruler or the like for measurement is also necessary.

For operating an image displayed on the operation panel in an image forming apparatus, it is possible to apply the method disclosed in '031 Reference. In the method disclosed in '031 Reference, it is possible to visually confirm that the displayed image is enlarged or reduced by the operation. There is a problem, however, that it is not at all possible to grasp the original size of the image and to grasp how large or how small the original image has been changed. If the purpose is simply to confirm the contents of the image, it is sufficient to enlarge the image to be large enough to allow visual recognition. If it is desired to output (print) the image in a different size, however, it may be likely that the image is output in a size much different from the intended size, wasting the recording paper. Particularly if image size must be adjusted repeatedly, much ink and recording paper would possibly be wasted.

SUMMARY OF THE INVENTION

In view of the problem described above, it is desired to provide an operation instructing device capable of easily instructing enlargement/reduction of an image displayed on a display device and enabling accurate confirmation as to how large an output image corresponding to the displayed image becomes, and to provide an image forming apparatus provided with such a device as well as a method of operation instruction.

The present invention provides an operation instructing device, including: a display unit that displays an image; and a detecting unit that detects a touched position and thereby specifies a corresponding position of the image displayed on the display unit; and while an image is displayed on the display unit, if the detecting unit detects at least two points touched in a partial area of the detecting unit corresponding to the image, assuming that the image is formed on recording paper, a distance between the two points of the image formed on the recording paper corresponding to the two touched points is calculated and displayed as a target distance on the display unit.

Preferably, if an instruction to change the distance between the two touched points is detected by the detecting unit, the target distance displayed on the display unit is changed in accordance with increase/decrease of the distance between the two touched points.

More preferably, a ratio of changed target distance to the target distance initially calculated by the detecting unit is determined to be a magnification when the image is formed on the recording paper.

More preferably, in the operation instructing device, a preview image is created by changing size of the image using the determined magnification; the preview image is displayed on the display unit such that a segment connecting two points on the preview image corresponding to the two touched points is positioned at the center of the display unit; and if an instruction to change inclination of the segment connecting the two touched points is detected by the detecting unit, the preview image is rotated in accordance with an amount of change in inclination and displayed on the display unit.

Preferably, in the operation instructing device, while an image is displayed on the display unit, if the detecting unit detects three points touched in an area of the detecting unit corresponding to the image, two of the three points are positioned along one of lengthwise and widthwise directions of the displayed image and the remaining one point and either of the two points positioned along the one direction are positioned along the other direction, a rectangle is defined by the three points; if an instruction to change the distance between the two points as vertexes of the rectangle in the lengthwise direction of the displayed image is detected by the detecting unit, magnification of the image in the lengthwise direction is determined in accordance with increase/decrease of the distance between the two points; and if an instruction to change the distance between the two points as vertexes of the rectangle in the widthwise direction of the displayed image is detected by the detecting unit, magnification of the image in the widthwise direction is determined in accordance with the increase/decrease of the distance between the two points.

The present invention also provides an image forming apparatus, including the operation instructing device described above and an image forming unit, wherein an image is formed by the image forming unit such that the target distance determined by the operation instructing device is realized.

The present invention further provides an operation instructing method, including the steps of: displaying an image on a display screen of a display device; while the image is displayed on the display screen, determining whether or not at least two points on the image are designated; and if it is determined that at least two points are designated, on an assumption that the image is formed on recording paper, calculating a distance between the two points of the image formed on the recording paper corresponding to the two designated points, and displaying the distance as a target distance on the display screen.

By the present invention, it is possible for the user to easily and correctly confirm and instruct the size of output image, by a touching operation with his/her finger on the preview image displayed on the touch-panel display. Therefore, erroneous instructing operation can be reduced, and wasteful consumption of ink and recording paper can be reduced.

On the touch-panel display, keys (up-key and down-key) for changing length of a prescribed portion are displayed, and the length can be changed by touching the keys. Therefore, an output image having the prescribed portion of which length is exactly the desired value can be obtained.

Further, since the distance between two points on the preview image can be designated by the pinch-out or pinch-in operation of fingers, the operation of enlarging/reducing the image is easy. Since the designated length is displayed on the screen image, an output image having the prescribed portion of which length is exactly the desired value can be obtained.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 shows an example of a screen image during a touch operation designating three points.

DESCRIPTION OF THE PREFERRED EMBODIMENTS

Figure 1:
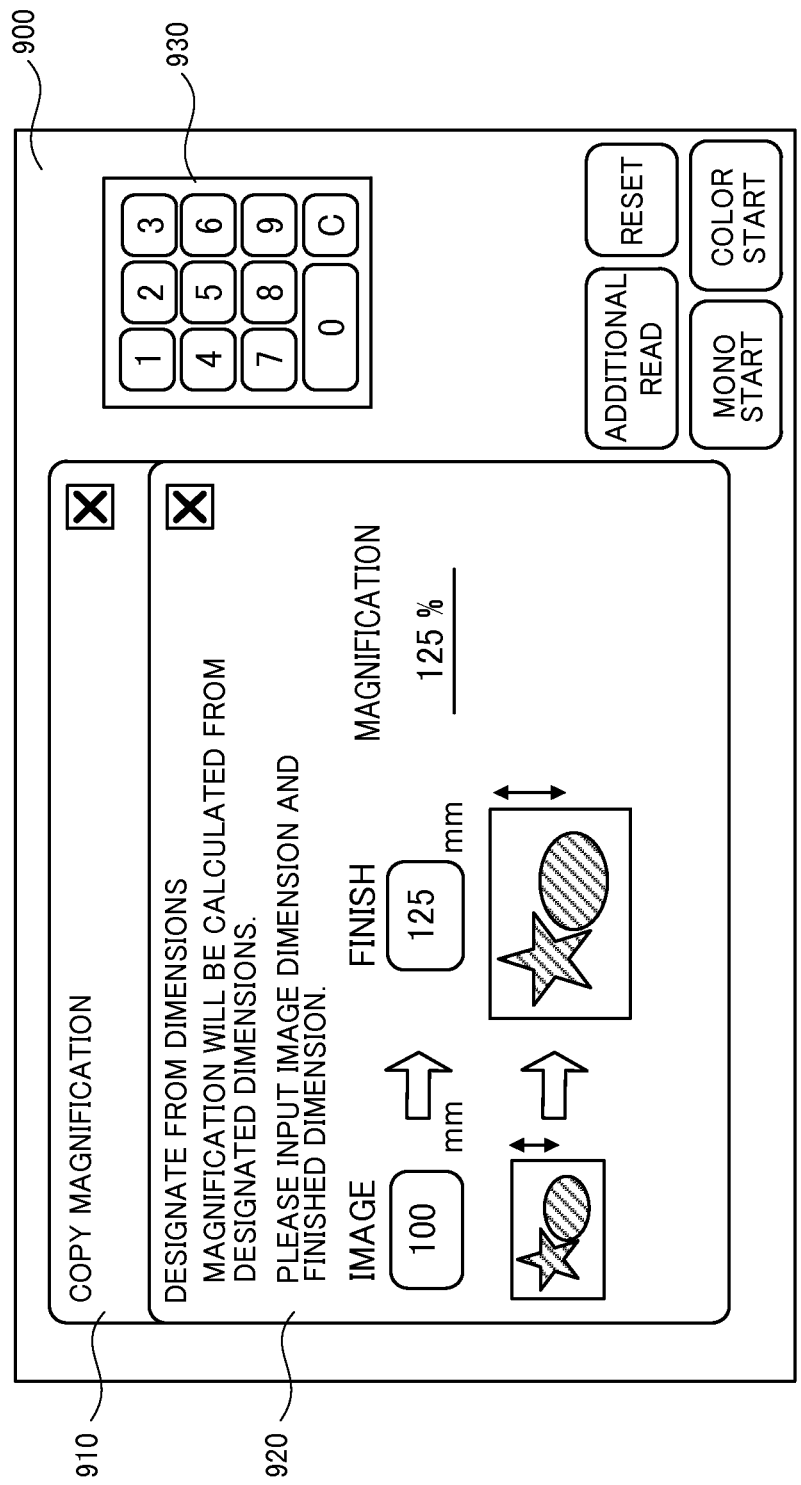
FIG. 1 shows an example of a screen image for designating copy magnification.

In the following embodiments, the same components are denoted by the same reference characters. Their names and functions are also the same. Therefore, detailed description thereof will not be repeated.

The image forming apparatus in accordance with the present embodiment is a digital multifunction peripheral having a plurality of functions including scanner function, copy function, facsimile function and printer function. In the following, an "image" means not only the displayed image but also image data. The "image data" means not only the image data but also text data as well as mixed data including images and texts.

In the present embodiment, as a touch-panel display, a device having a touch-panel arranged on a display panel is used. The touch-panel may be any of resistive, capacitive, electromagnetic induction, infrared, and surface acoustic wave type touch-panels. The touch-panel display is not limited to a device having the touch-panel arranged on the display panel, and it may be a device having a position input device integrated with the display panel. By way of example, a device may be used in which an optical sensor is provided in each pixel of a liquid crystal panel as the display panel, so that an object on the surface of liquid crystal panel can be recognized by the optical sensors.

In the following, the term "touch" means that a position is made detectable by an input position detecting device, and "touch" may include touching and pressing the detecting device, just touching and not pressing the detecting device, and coming very close to but not touching the detecting device. Where a non-contact type detection device is used, "touch" means coming very close to the detecting device, that is, to a distance that allows detection of the input position.

Figure 2:
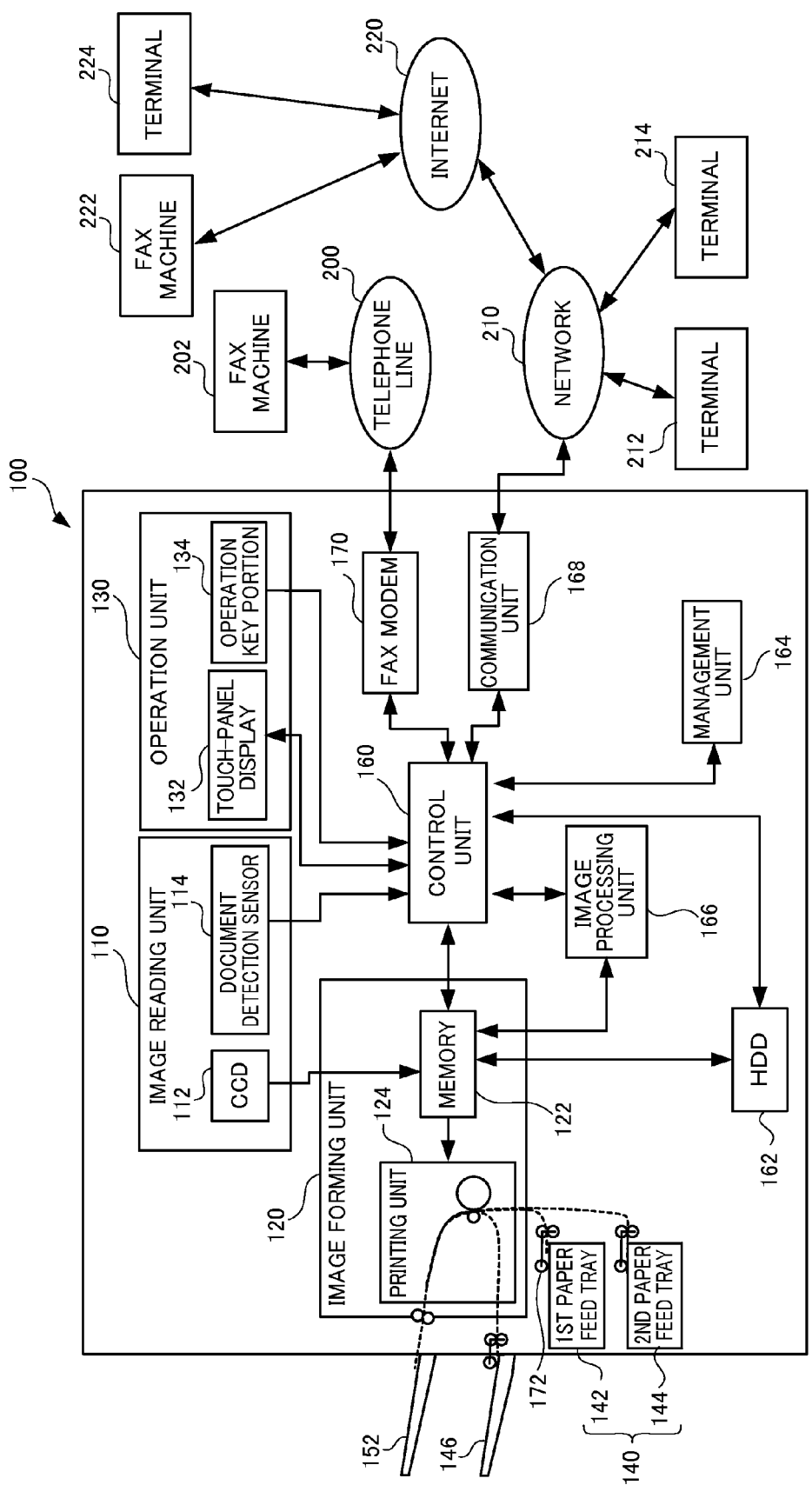
FIG. 2 is a block diagram schematically showing an internal configuration of an image forming apparatus in accordance with an embodiment of the present invention.

In the following, various units and portions of an image forming apparatus 100 in accordance with an embodiment of the present invention will be described with reference to FIG. 2.

An image reading unit 110 reads a document and creates image data. Image reading unit 110 may include, for example, a CCD (Charge Coupled Device) 112 for reading an image, and a document detection sensor 114 for detecting a document set on a platen or on an automatic document feeder (ADF).

An operation unit 130 includes an operation key portion 134 provided with various input keys (hardware keys) and a touch-panel display 132 having a touch-panel arranged on a display panel such as an LCD (Liquid Crystal Display). The user inputs various settings and operations of image forming apparatus 100 through operation unit 130. Operation unit 130 may be provided with means for inputting authentication information, allowing input of authentication information of users using image forming apparatus 100. Possible method of inputting user authentication information may include direct input of user code, input by reading information of an ID card, and input by reading biometric information (such as fingerprint) of the user. User authentication is made possible by any of these methods. It is also possible for the user to instruct interruption, that is, to suspend a recording job and insert another job, through operation unit 130.

A control unit 160 monitors user operations on touch-panel display 132 and input keys provided on operation unit 130, and displays, on touch-panel display 132, any information to be notified to the user, such as information related to the state of image forming apparatus 100. A management unit 164 is a memory for storing control information, setting information and the like of image forming apparatus 100. Control unit 160 controls overall operation of image forming apparatus 100 based on the information stored in management unit 164.

An image forming unit 120 processes and outputs image data. Image forming unit 120 includes a memory 122, and a printing unit 124 such as an LSU (Laser Scanning Unit). Image forming unit 120 once stores image data read by image reading unit 110 in memory 122 and, thereafter, stores the image data on memory 122 to an HDD 162. Image forming unit 120 reads the image data stored in HDD 162 to memory 122, transmits the data to printing unit 124, and thus the data is output, printed on recording paper.

HDD 162 stores input image data. HDD 162 is a magnetic storage medium, capable of storing and successively processing huge amount of image data. Thus, image forming apparatus 100 can process instructions from a plurality of users with high efficiency.

An image processing unit 166 is controlled by control unit 160 that receives a user instruction through operation unit 130. Image processing unit 166 reads image data from memory 122, executes instructed image processing, and stores the result in memory 122. Image data as the result of processing is displayed on touch-panel display 132 through control unit 160. Thereafter, the image data on memory 122 is transmitted to printing unit 124 and printed on recording paper, output to a telephone line 200 through a FAX modem 170, or output to a network, 210 through a communication unit 168, in response to a user instruction.

In the following, various modes for executing the functions (copy function, printer function, scanner function and facsimile function) of image forming apparatus 100 will be briefly described.

(Copy Mode)

When image forming apparatus 100 is used as a copy machine, image data of a document read by image reading unit 110 is output as a copy from image forming unit 120.

By CCD 112 provided in image reading unit 110, an image of a document set at a reading position can electronically be read. The read image data is completed as output data (print data) on memory 122, and then stored in HDD 162. If there is a plurality of documents, the reading operation and the storage operation are repeated. Thereafter, based on a processing mode instructed from operation unit 130, image data stored in HDD 162 is successively read at appropriate timing and sent to memory 122. Then, the image data is transferred from memory 122 to printing unit 124, timed with image formation at printing unit 124.

When a plurality of pages of read image data are to be printed, the image data stored page by page in HDD 162 is transferred as output data from HDD 162 to memory 122 and transferred to printing unit 124 timed with image formation at printing unit 124, repeatedly by the number of pages to be output.

Specifically, recording paper is drawn by a pick-up roller (for example, a pick-up roller 172 of a first paper feed tray 142), from any of a first paper feed tray 142, a second paper feed tray 144 and a manual paper feed tray 146. The drawn recording paper is conveyed through the inside of printing unit 124 by means of a plurality of conveyer rollers (in FIG. 2, cross-sections of these rollers are represented by a plurality of circles). In FIG. 2, conveyer paths of sheets of recording paper drawn from first paper feed tray 142, second paper feed tray 144 and manual paper feed tray 146 are represented by dotted lines. LSU exposes a charged photoreceptor drum (not shown) in accordance with the input image data. Consequently, electrostatic latent image corresponding to the image data is formed on a surface of the photoreceptor drum. The electrostatic latent image on the photoreceptor drum is transferred by a transfer belt to the fed recording paper. Thereafter, the sheet of recording paper is heated and pressed (whereby the image is fixed on the sheet of recording paper), and then discharged to a discharge tray.

(Printer Mode)

When image forming apparatus 100 is used as a printer, the image data received through communication unit 168 is output from image forming unit 120 through memory 122 or the like.

Communication unit 168 is connected to network 210 by wired or wireless manner, and receives image data from terminals 212 and 214 connected to network 210 and from a terminal 224 through the Internet 220. The received image data is sent page by page as output image data to memory 122, and then stored in HDD 162. Then the image data is again sent from HDD 162 to memory 122, transferred to printing unit 124 in the similar manner as in the copy mode described above, and image is formed.

(Scanner Mode)

When image forming apparatus 100 is used, for example, as a network scanner, document image data read by image reading unit 110 is transmitted to an arbitrary terminal 212 or 214 from communication unit 168 through network 210. Here again, by CCD 112 provided in image reading unit 110, the document is read electronically. The read image data of the document is completed as output data on memory 122, and stored in HDD 162. The image data is again sent from HDD 162 to memory 122, and after a communication with a designated transmission destination is established through operation unit 130, transmitted to the designated transmission destination from communication unit 168.

(Facsimile Mode)

As described above, image forming apparatus 100 has FAX modem 170 connected to telephone line 200, and communication unit 168 connected to network 210 and to the Internet 220. Therefore, image forming apparatus 100 can transmit/receive FAX with a facsimile machine 202 through telephone line 200 and can transmit/receive FAX with a facsimile machine 222 through network 210 and the Internet 220.

When image forming apparatus 100 is used as a facsimile machine, data received by FAX from facsimile machine 202 or 222 may be formed as image data in memory 122 and stored in HDD 162 or printed by printing unit 124 in the similar manner as described above. Further, image forming apparatus 100 may read image data from HDD 162, convert the data to a data format for FAX communication and transmit the data to facsimile machine 202 or 222.

In image forming apparatus 100, the user can designate the size of an output image, or the user can perform the operation of enlarging/reducing the image size, by a touch-operation of a preview image displayed on the touch-panel display. In the following, a control structure of a program executed by control unit 160 for realizing the touch operation will be described.

Figure 3:
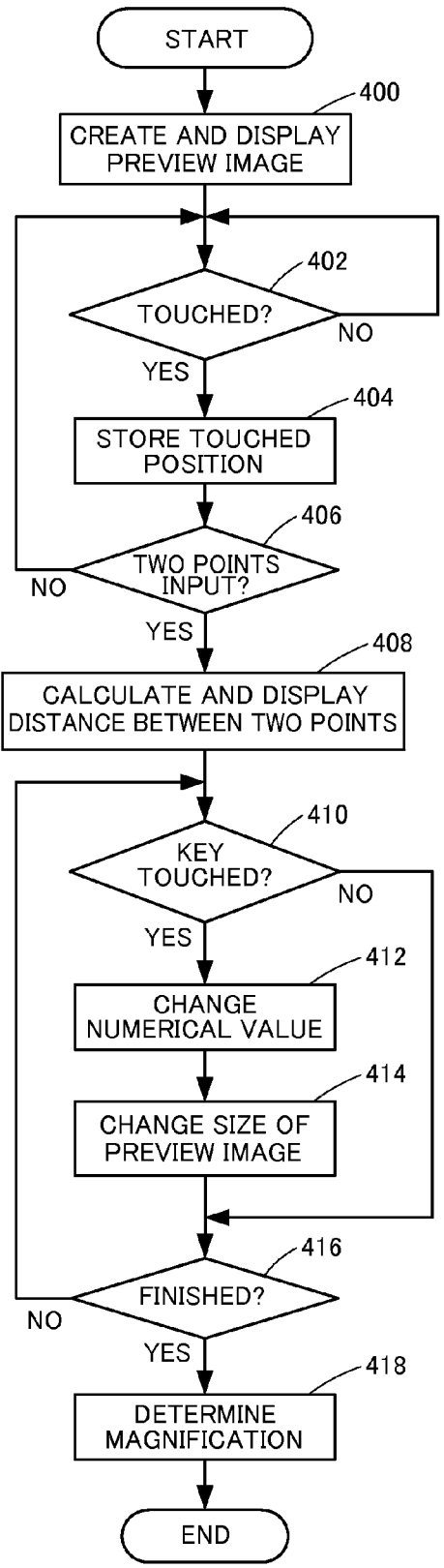
FIG. 3 is a flowchart representing a control structure of a program realizing the touch operation in the image forming apparatus in accordance with an embodiment of the present invention.

Referring to FIG. 3, at step 400, control unit 160 creates a preview image and displays the preview image on touch-panel display 132. By way of example, when a document is scanned, read image data is stored in memory 122. On the image data, image processing unit 166 performs image processing under the control of control unit 160, and creates image data (reduced image data) to be displayed in a prescribed size at a prescribed position on touch-panel display 132. The generated image data is sent from image processing unit 166 to touch-panel display 132 under the control of control unit 160, and displayed as preview image on the display panel.

At step 402, control unit 160 determines whether or not the preview image displayed on touch-panel display 132 is touched. Control unit 160 determines whether or not a touch-panel area corresponding to the display panel area on which the preview image is displayed is touched, for example, by a finger of the user. Step 402 is repeated until it is determined that the image is touched. If the determination of touching is made, the control proceeds to step 404.

At step 404, control unit 160 determines position coordinates of the touched point in accordance with a signal received from touch-panel display 132, and stores the coordinates as first coordinate data. The position coordinates may be found by known technique, by determining a coordinate system in advance on touch-panel display 132. When the user touches the touch-panel, a prescribed small area on the touch-panel is detected. A representative point in the detected area is determined to be the touched point. The method of determining the representative point may be arbitrarily selected, and the center of gravity, an upper end, or a left end point, for example, may be used as the representative point.

At step 406, control unit 160 determines whether or not coordinates of two points have been stored. If the coordinates of two points have not yet been stored, the control returns to step 402. Specifically, control unit 160 determines the coordinates of the second point at step 404 in the similar manner as described above, and stores the coordinates as the second coordinate data.

If the coordinates of two points are determined, at step 408, control unit 160 calculates the distance between the two points, stores the resulting value as an initial value of target distance and displays the value on touch-panel display 132. At this time, control unit 160 draws a segment (line) connecting the two points on touch-panel display 132, and also displays an up-key 512 and a down-key 514 for increasing and decreasing the displayed numerical value, respectively. The target distance refers to the distance the user wishes to realize on the actual output image. Therefore, the target distance can be changed by the user operation as will be described later.

The distance can be calculated from the first and second coordinate data (coordinate values on the touch-panel) stored at step 404 and the resolution of the image. Image forming apparatus 100 has information of the resolution and size of the stored image data. By way of example, when a document is scanned, the resolution of the image and the area for scanning are designated. By way of example, the resolution may be designated as 300 dpi or 600 dpi, and the size of the area to be scanned is designated. If specific designation is not made, the document is scanned with the default resolution and default size (for example, 600 dpi, A4). Since the correspondence relation between the size of preview image displayed on the touch-panel (pixel size on touch-panel display 132) and the size (dpi value) of the corresponding area of the scanned image data is known, the actual distance between the two points on the document can be calculated geometrically. If different resolutions should be designated on the lengthwise and widthwise directions of the image, what is different is only the correspondence relation between the preview image and the dpi value in the lengthwise and widthwise directions and, therefore, similar calculation is possible. These procedures are well known to a person skilled in the art and, therefore, further description will not be repeated.

Figure 4:
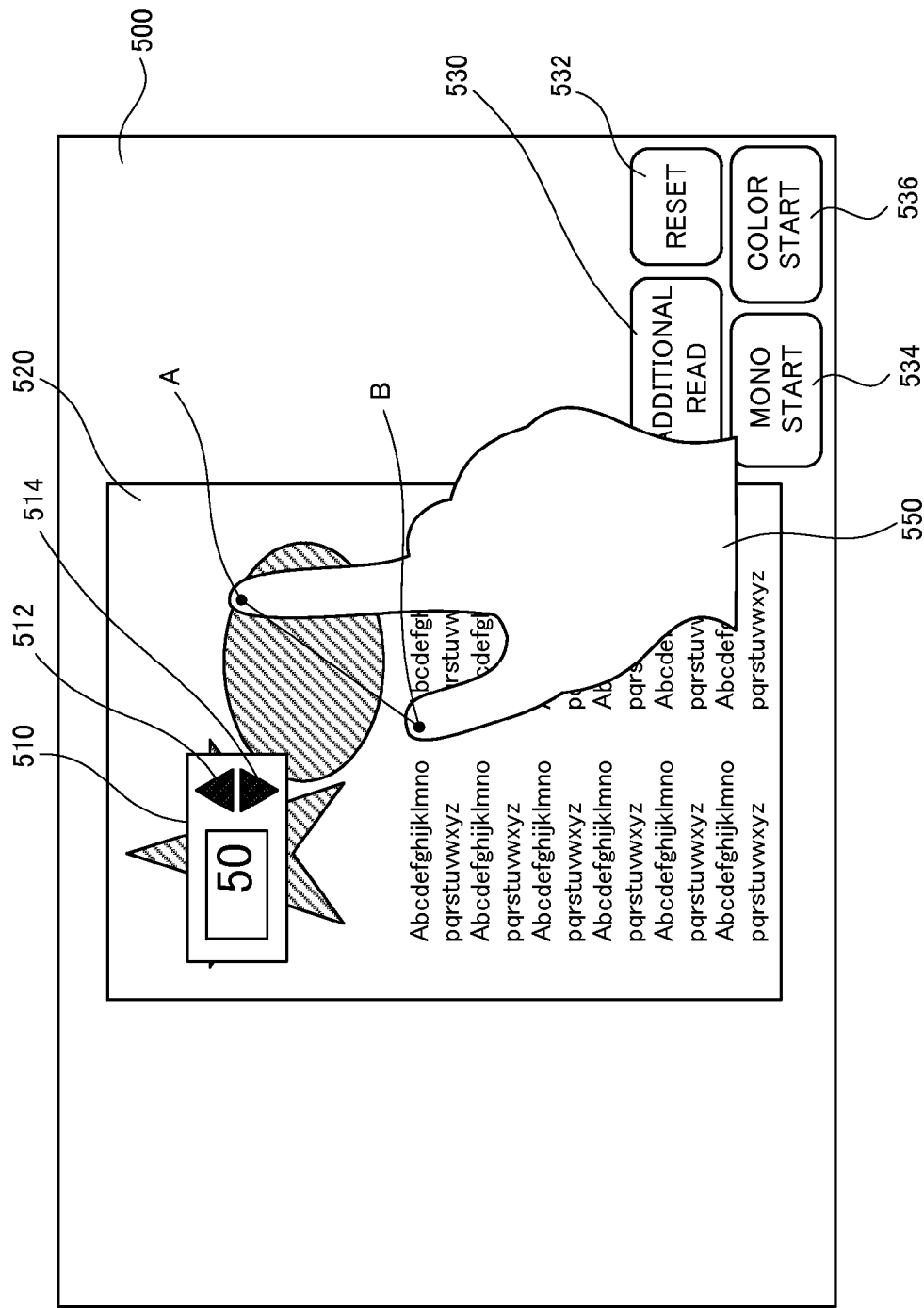
FIG. 4 shows an example of a screen image during a touch operation.

Referring to FIG. 4, steps 404 to 408 will be supplemented. FIG. 4 shows a state in which a preview image 520 is displayed on a screen image 500 on touch-panel display 132 and the user is touching the touch-panel with index finger and thumb of his/her right hand 550. Preview image 520 is a portrait image having texts displayed below a figure. A point A represents a point on the touch-panel touched by the index finger, and a point B represents a point on the touch-panel touched by the thumb.

By way of example, assume that the user touches the touch-panel first with his/her index finger and then by the thumb. Then, by the repeated process of step 402, control unit 160 obtains the coordinates of point A as the first coordinate data, and the coordinates of point B as the second coordinate data. Then, at step 406, control unit 160 calculates the distance between the two points A and B and displays the calculated distance in, for example, the unit of mm, near the two points A and B. It can be seen from FIG. 4 that the distance between points A and B is 50 mm. On a distance display area 510, up-key 512 and down-key 514 are displayed. Even when the user moves his/her finger/thumb away from the touch-panel in this state, the contents displayed on screen image 500 are maintained.

On a task trigger area at a lower right corner of screen image 500, four trigger keys (additional read key 530, a reset key 532, a mono start key 534 and a color start key 536) are displayed. These keys are operated by the user for actually operating image forming apparatus 100 after the setting is completed. When mono start key 534 or color start key 536 is pressed, image forming apparatus 100 starts monochrome (black and white) copy or color copy. When additional read key 530 is pressed, image forming apparatus 100 starts the process of scanning a document and reading as image data. When reset key 532 is pressed, image forming apparatus 100 clears all settings.

At step 410, control unit 160 determines whether up-key 512 or down-key 514 is touched. If the determination is negative, the control proceeds to step 416.

If the determination is positive, at step 412, control unit 160 increases/decreases the numerical value displayed on distance display area 510 depending on whether up-key 512 or down-key 514 is touched. If up-key 512 is determined to be touched, control unit 160 increases the numerical value on distance display area 510 by a prescribed value (for example, "1"). If down-key 514 is determined to be touched, control unit 160 decreases the numerical value on distance display area 510 by a prescribed value (for example, "1"). Control unit 160 stores the value resulting from the increase/decrease as a new target distance.

At step 414, control unit 160 changes the size of displayed preview image in accordance with the value set at step 412. Specifically, control unit 160 creates and displays a new preview image by enlarging or reducing the original image data using as a magnification a value obtained by dividing the value determined at step 412 by the initial value of target distance stored at step 408. Control unit 160 draws a segment connecting the designated two points on the enlarged or reduced preview image. When the image is enlarged, it is desirable to display a new preview image such that the designated two points are within the preview image, for example, the segment connecting the two points is positioned substantially at the center of the preview image.

At step 416, control unit 160 determines whether or not designation of the distance between two points of the output image has been finished. By way of example, designation is determined to be finished if a trigger key for executing an output process is pressed. In the copy mode, if mono start key 534 or color start key 536 is pressed, the designation is determined to be finished. Control unit 160 may display a key (for example, an "OK" key) instructing an end on screen image 500, and if this key is pressed, designation may be determined to be finished. If designation is not determined to be finished, the control returns to step 410, and the process of steps 410 to 414 is repeated.

Figure 5:
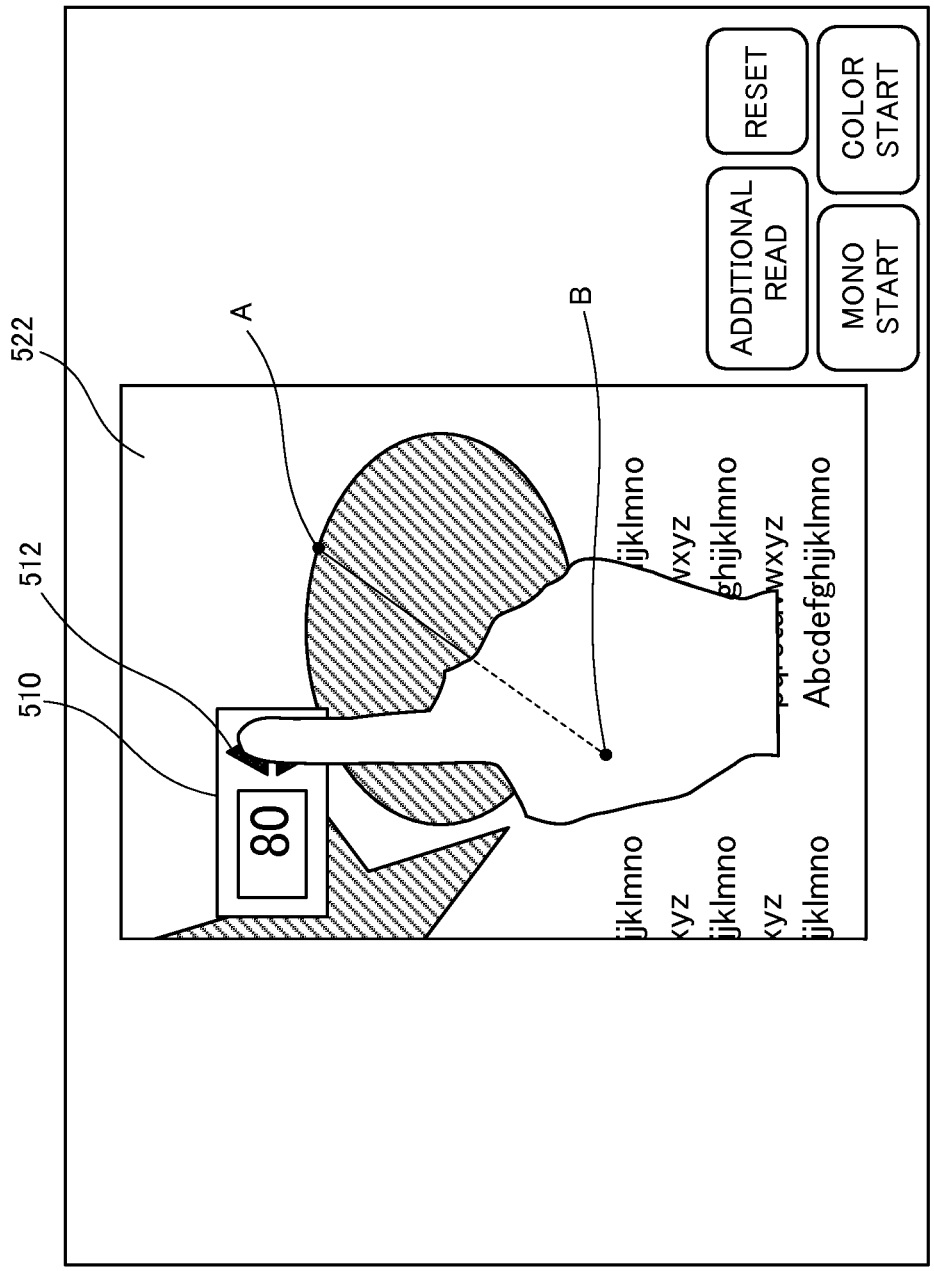
FIG. 5 shows a state in which an image enlarged by the touch operation is displayed.

FIG. 5 shows a screen image displayed when the user touches up-key 512 a number of times and the process of steps 410 to 416 is repeated, from the state shown in FIG. 4. Since the user touched up-key 512 a number of times, the distance display (target distance) on distance display area 510 has been changed to 80 mm. On the screen image, a preview image 522 enlarged by the corresponding magnification (80/50=1.6) is displayed. On preview image 522, also the segment connecting the two designated points A and B is shown in enlargement.

If it is determined at step 416 that designation is finished, the control proceeds to step 418. At step 418, control unit 160 stores the finally obtained magnification as the final magnification and ends the series of operations described above. Thereafter, when a designated task (copy, FAX transmission or the like) is to be executed, the original image is enlarged or reduced using the final magnification, so that the target distance determined at step 412 is realized on the output image.

By the process as described above, it is possible for the user to easily confirm the preview image in which the distance between two designated points is set to a designated value by touching the preview image displayed on touch-panel display 132 with his/her fingers and to easily obtain the output image (for example, a print) of a desired size.

Though an example in which a new preview image is created and displayed at step 414 every time the target distance is changed has been described, the example is not limiting. By way of example, if up-key 512 and down-key 514 are touched repeatedly in a short time period, the preview image may not be newly created each time, but after a prescribed time period without touching, the magnification may be calculated using the last designated target distance and the new preview image may be created and displayed accordingly.

Though FIG. 4 shows an example in which the two points on the preview image are designated by the index finger and the thumb, the two points may be designated by any method. The points may be designated one by one by the index finger.

FIG. 4 shows an example in which the position of displaying distance display area 510 is in the vicinity of two designated points. The example, however, is not limiting. Though the position of display may be anywhere, it is desired that the area is near the left side of two designated points, since operations are mostly done by the right hand. Alternatively, the position for displaying distance display area 510 may be designated at initialization or may be designated by the user.

Up-key 512 and down-key 514 may be displayed at any position, and these keys may be displayed outside the distance display area 510. It is desirable to display up-key 512 and down-key 514 on the right side of displayed value, since operations are mostly done by the right hand.

Figure 6:
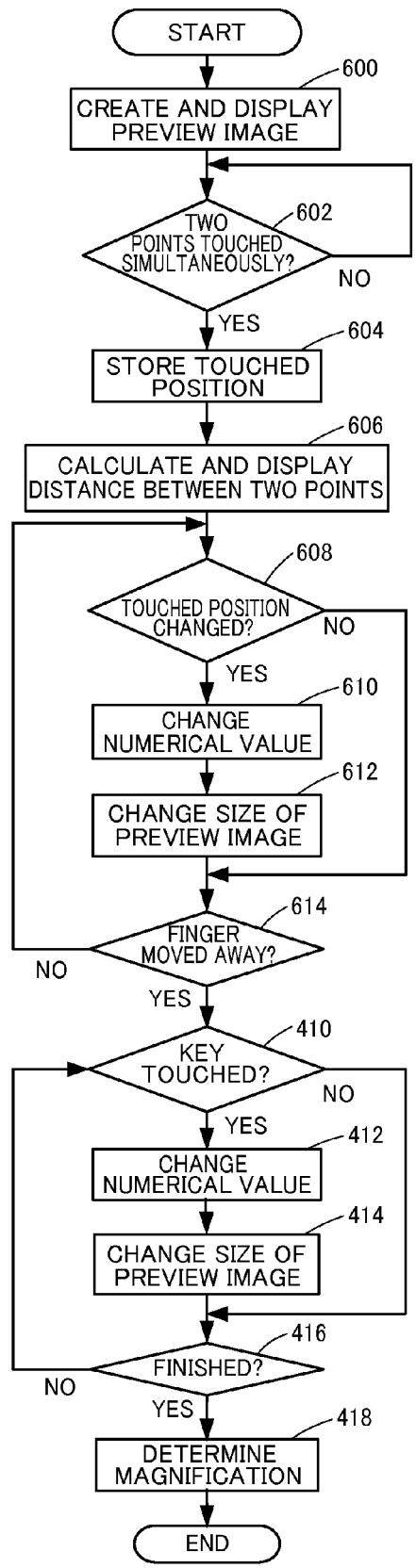
FIG. 6 is a flowchart representing a control structure of a program realizing another example of the touch operation in the image forming apparatus in accordance with an embodiment of the present invention.

Though an example in which two points are designated and thereafter the distance between the two points is changed by up-key 512 and down-key 514 has been described above, the example is not limiting. The user touching the touch-panel with two fingers may widen or narrow the distance between the fingers to designate the distance. A control structure of a program for realizing the process in this case will be described with reference to FIG. 6.

At step 600, similar to step 400 of FIG. 3, control unit 160 generates a preview image and displays it on touch-panel display 132.

At step 602, control unit 160 determines whether or not two points on the preview image displayed on touch-panel display 132 are simultaneously touched. Control unit 160 determines whether or not two fingers of the user are simultaneously touching a touch-panel area corresponding to the display panel area on which the preview image is displayed. Step 602 is repeated until it is determined that two points are simultaneously touched. If it is determined that two points are simultaneously touched, the control proceeds to step 604.

At step 604, control unit 160 determines coordinates of two touched points, and stores the coordinates as the first and second coordinate data, in accordance with a signal received from touch-panel display 132.

At step 606, control unit 160 calculates the distance between the two points, stores the resulting value as the initial value of target distance, and displays the value on touch-panel display 132. At this time, control unit 160 draws a segment connecting the two points on touch-panel display 132, and also displays up-key 512 and down-key 514 for increasing and decreasing the displayed numerical value, respectively.

At step 608, control unit 160 determines whether or not the position of at least one of the two points being touched has been changed. If the determination is negative, the control proceeds to step 614. At this time, control unit 160 should preferably determine considering the instability of touching operation by the user. Though the user feels that he/she is touching the same points on the touch panel, actually, the positions touched by the fingertips may not be the same. The shape of small touched area (on a contact type panel, for example, the area where the finger is touching the touch-panel) changes and the representative point (for example, center of gravity) representing the touched point also changes, though slightly. Therefore, control unit 160 determines that the touched position is changed if the change of position coordinates of the touched point is equal to or larger than a prescribed value.

If it is determined at step 608 that the position has been changed, the control proceeds to step 610. At step 610, control unit 160 calculates the distance between the two points using the changed position coordinates, stores the result of calculation, and displays the result on distance display area 510.

At step 612, control unit 160 changes the size of displayed preview image in accordance with the distance calculated at step 610. Specifically, control unit 160 creates and displays a new preview image by enlarging or reducing the original image data using as a magnification a value obtained by dividing the value determined at step 610 by the initial value of target distance stored at step 606. At this time, control unit 160 draws a segment connecting the designated two points on the enlarged or reduced preview image.

Since the magnification is determined solely by the distance between the two points, it is not always the case that opposite ends of the segment on the newly displayed preview image match the positions touched by the user. If the user changes the space between the fingers such that the inclination of the segment connecting the two points is substantially kept unchanged, the opposite ends of the segment approximately match the positions touched by the user. If the inclination of the segment connecting the two points is changed when the user changes the space between the fingers, the opposite ends of the segment come to be deviated from the positions touched by the user. Typically, however, the deviation is not a significant difference and, therefore, such deviation does not affect the user operation.

At step 614, control unit 160 determines whether or not at least one of the two touching fingers of the user is moved away from the touch panel. If it is determined that neither of the fingers is moved away, the control proceeds to step 608, and the process of steps 608 to 612 is repeated.

Figure 7:
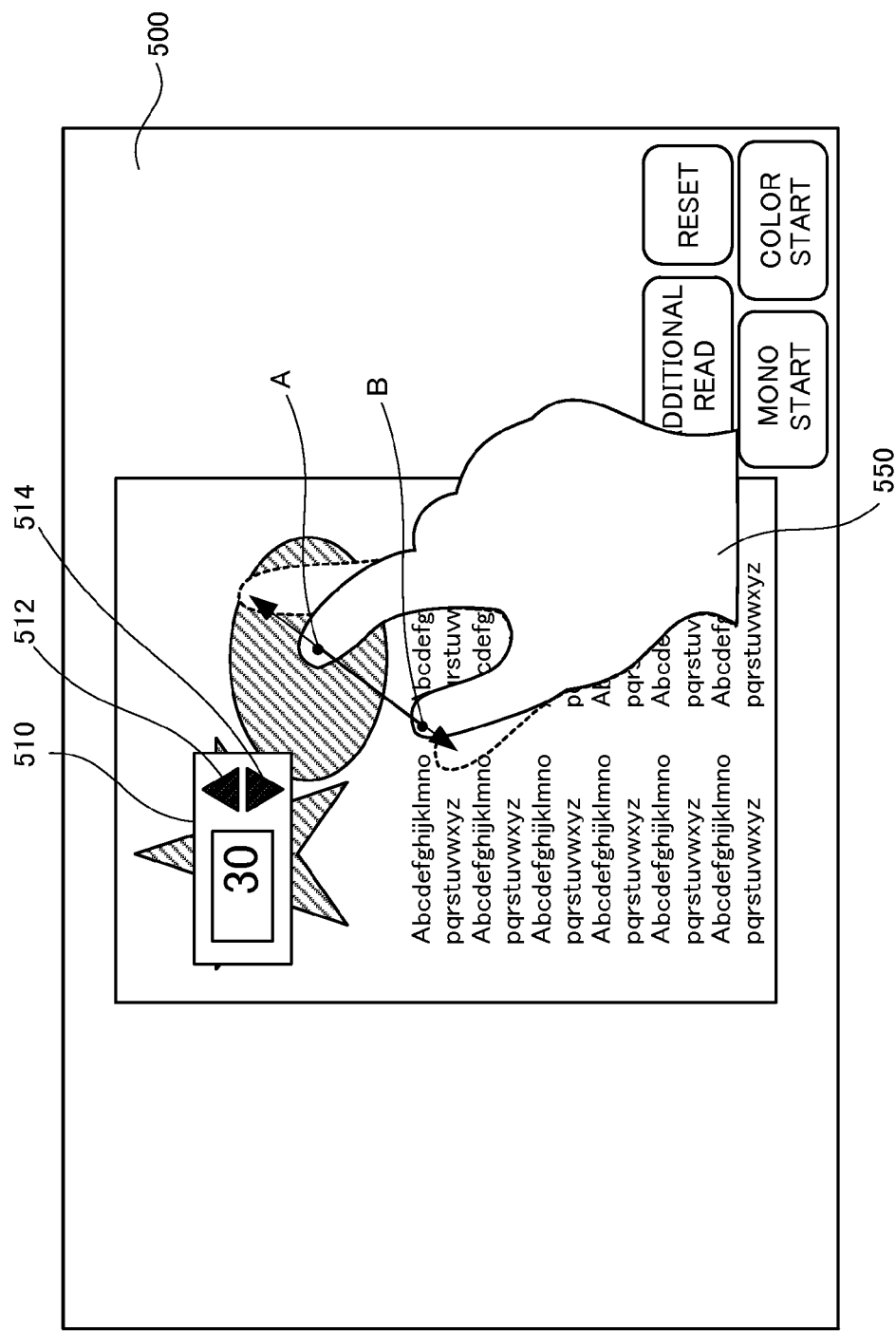
FIG. 7 shows an example of a screen image during a touch operation.

Referring to FIG. 7, the description of steps 602 to 614 will be supplemented. FIG. 7 shows a state in which a preview image is displayed on screen image 500 on touch-panel display 132, and the user is touching the touch-panel simultaneously with the index finger and the thumb of his/her right hand 550. The displayed contents of screen image 500 are the same as those shown in FIG. 4.

In this state, at step 604, control unit 160 obtains the coordinates of point A as the first coordinate data, and obtains the coordinates of point B as the second coordinate data. Then, at step 606, control unit 160 calculates the distance between the two points A and B, and displays the calculated distance in, for example, the unit of mm, near the two points A and B. In FIG. 7, the distance between the two points A and B is 30 mm. This means that the space between the index finger and the thumb of the user is narrower than in the example of FIG. 4. On distance display area 510, up-key 512 and down-key 514 are displayed.

From this state, when the user moves the index finger and the thumb while touching the touch-panel in the direction of the arrow to widen the space between the fingers as represented by the dotted line (pinch-out or pinch-open), at step 608, control unit 160 detects the change of touched positions and executes steps 610 and 612. Thus, the distance between the two points and the magnification are calculated, the value in distance display area 510 is updated, the image is enlarged by the obtained magnification and a new preview image is created and displayed. When the user moves the index finger and the thumb while touching the touch-panel to narrow the space (pinch-in, pinch-close), similar process takes place and a new preview image is created and displayed.

The process of steps 410 to 418 following step 614 is the same as that shown in FIG. 4 and, therefore, description thereof will not be repeated.

By the process as described above, it is possible for the user to easily confirm the preview image in which the distance between two designated points is set to a designated value with a feeling of directly operating the preview image displayed on touch-panel display 132 and to easily obtain the output image (for example, a print) of a desired size. Further, by roughly designating the length by the touch operation and then performing fine adjustment by touching up-key 512 and down-key 514 displayed on distance display area 510, the user can obtain the image of a desired size quickly.

Though FIG. 7 shows an example in which two points on the preview image are simultaneously designated by the index finger and the thumb, the example is not limiting. The length may be designated by, for example, touching the touch-panel simultaneously with index fingers of the left and right hands.

Though an example in which the process proceeds to the step of determining whether up-key 512 or down-key 514 is touched if it is determined at step 614 that the finger is moved away has been described, the example is not limiting. Even if it is once determined that the finger is moved away, determination as to whether the two points are simultaneously touched may be repeated. By such an approach, it becomes possible for the user to designate by one hand a length longer than the maximum space between the fingers.

Though an example in which only the distance between the two points is used and the change in inclination of the segment connecting the two points is not considered has been described above, the preview image may be displayed rotated in accordance with the inclination of the segment connecting the two points. By way of example, if a document is scanned askew, the preview image is also displayed askew. In such a situation, an angle of rotation may be designated to obtain an output image of correct direction simultaneously with the designation of the output size. Further, by rotating the image such that the two points are positioned on two diagonal corners of the recording paper, the output can be provided on the recording paper with the distance between the two points maximized.

Though an example in which the same magnification is set for the lengthwise direction and widthwise direction of the image has been described above, the magnifications may be set differently for the lengthwise and widthwise directions. For example, for a rectangular area having the designated two points as vertexes on a diagonal, the lengths in the lengthwise and widthwise directions may be set independent from each other to obtain an output image. In that case, if the difference in the X coordinates and the difference in the Y coordinates of the two points designated by touching the touch-panel are displayed as distances of respective directions in the similar manner as shown in FIG. 4 on the screen image, the distances can be changed independently using the up-key and down-key. In this case, the new preview image may be generated using the magnifications of the lengthwise and widthwise directions as well as the resolutions (dpi values) in lengthwise and widthwise directions of the original image. Further, it is possible to designate vertexes (three points or four points) of the rectangle on the screen image by touching and to set the length in lengthwise and widthwise directions independently from each other using the up-key and the down-key.

It is also possible to designate the size in the lengthwise and widthwise directions independently while three or more points of the preview image are kept simultaneously touched. By way of example, as shown in FIG. 8, a rectangle 560 can be designated by three points A, B and C on the touch-panel, simultaneously touched by the index finger and the thumb of the left hand 552 and the index finger of the right hand 550. The length in the lengthwise direction of rectangle 560 is displayed in a distance display area 516 for the lengthwise direction and the length in the widthwise direction is displayed in a distance display area 518 for the widthwise direction. For instance, using the upper left vertex of the preview image as the origin of XY coordinates (X axis corresponds to the widthwise direction and Y axis corresponds to the lengthwise direction), the distance between points A and B (difference in Y coordinates) is displayed in distance display area 516 for the lengthwise direction. The distance between two points B and C (difference in X coordinates) is displayed in distance display area 518 for the widthwise direction. In this manner, it is possible for the user to designate the length in the lengthwise direction by changing the space between the index finger and the thumb of the left hand 552, and to designate the length in the widthwise direction by moving the index finger of the right hand to the left/right. By roughly designating the lengths in the lengthwise and widthwise directions by the touch operation and then performing fine adjustment by touching up-key and down-key displayed on each of distance display area 516 for the lengthwise direction and distance display area 518 for the widthwise direction, the user can obtain the image of a desired size quickly. Further, it is also possible to realize enlargement/reduction by the touch operation while continuously touching four points (for example, vertexes of the rectangle) simultaneously with the index fingers and the thumbs of both hands, in the similar manner as described above. Further, it is also possible to enlarge/reduce by the touch operation designating five or more points.

In the foregoing, an example has been described in which the present invention is applied to an image forming apparatus. The example, however, is not limiting. The present invention is applicable to any electronic equipment provided with a touch-panel display capable of displaying an image, for handling data to be output as an image, for example, on a recording paper.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An operation instructing device, comprising:
a display unit that displays an image; and
a detecting unit that detects a touched position and thereby specifies a corresponding position of the image displayed on said display unit; wherein
while an image is displayed on said display unit, if said detecting unit detects at least two points touched in a partial area of said detecting unit corresponding to the image, assuming that the image is formed on recording paper, a distance between the two points of the image formed on said recording paper corresponding to said two touched points is calculated and displayed as a target distance on said display unit;
a key for increasing/decreasing value of said target distance is displayed on said display unit when a touch is detected by said detecting unit;
if an instruction to increase/decrease said value of said target distance, by a change in touched positions while the touch of said two points detected by said detecting unit is maintained, is detected by said detecting unit, said target distance is updated to the distance between said two points after the change in touched positions;
if an instruction to said key to increase/decrease said value of said target distance is detected by said detecting unit, said target distance displayed on said display unit is updated by increasing/decreasing said target distance in accordance with said instruction to increase/decrease to said key; and
a ratio of changed target distance to the target distance initially calculated by said detecting unit is determined to be a magnification when said image is formed on the recording paper.

2. The operation instructing device according to claim 1, wherein
a preview image is created by changing size of said image using said determined magnification;
said preview image is displayed on said display unit such that a segment connecting two points on said preview image corresponding to said two touched points is positioned at the center of said display unit; and
if an instruction to change inclination of the segment connecting said two touched points is detected by said detecting unit, said preview image is rotated in accordance with an amount of change in inclination and displayed on said display unit.

3. An image forming apparatus, comprising:
the operation instructing device according to claim 1; and
an image forming unit; wherein
an image is formed by said image forming unit such that said target distance determined by said operation instructing device is realized.

4. An operation instructing device, comprising:
a display unit that displays an image, and
a detecting unit that detects a touched position and thereby specifies a corresponding position of the image displayed on said display unit; wherein
while an image is displayed on said display unit, if said detecting unit detects at least two points touched in a partial area of said detecting unit corresponding to the image, assuming that the image is formed on recording paper, a distance between the two points of the image formed on said recording paper corresponding to said two touched points is calculated and displayed as a target distance on said display unit;
while an image is displayed on said display unit, if said detecting unit detects three points touched in an area of said detecting unit corresponding to said image, two of said three points are positioned along one of lengthwise and widthwise directions of said displayed image and the remaining one point and either of said two points positioned along the one direction are positioned along the other direction, a rectangle is defined by said three points;
if an instruction to change the distance between the two points as vertexes of said rectangle in said lengthwise direction of said displayed image is detected by said detecting unit, magnification of said image in the lengthwise direction is determined in accordance with increase/decrease of the distance between the two points; and
if an instruction to change the distance between the two points as vertexes of said rectangle in said widthwise direction of said displayed image is detected by said detecting unit, magnification of said image in the widthwise direction is determined in accordance with the increase/decrease of the distance between the two points.

5. An operation instructing method, comprising the steps of:
displaying an image on a display screen of a display device;
while the image is displayed on said display screen, determining whether or not at least two points on said image are designated;
if it is determined that at least two points are designated, on an assumption that the image is formed on recording paper, calculating a distance between the two points of the image formed on said recording paper corresponding to said two designated points, and displaying the distance as a target distance on said display screen, and displaying a key for increasing/decreasing value of said target distance on said display screen;
if an instruction to increase/decrease said value of said target distance, by a change in touched positions while the touch of said two points is maintained, is detected, updating said target distance to the distance between said two points after the change in touched positions;

if an instruction to said key to increase/decrease said value of said target distance is detected, updating said target distance displayed on said display unit by increasing/decreasing said target distance in accordance with said instruction to increase/decrease to said key; and determining a ratio of changed target distance to the target distance initially calculated by said detecting unit to be a magnification when said image is formed on the recording paper.

* * * * *